(12) United States Patent
Lu

(10) Patent No.: US 6,657,856 B1
(45) Date of Patent: Dec. 2, 2003

(54) HINGE FOR A NOTEBOOK COMPUTER

(76) Inventor: Sheng-Nan Lu, No. 174, Chunying St., Shulin Chen, Taipei Hsien (TW)

( * ) Notice: Subject to any disclaimer, the term of this patent is extended or adjusted under 35 U.S.C. 154(b) by 0 days.

(21) Appl. No.: 10/191,158

(22) Filed: Jul. 8, 2002

(51) Int. Cl.⁷ .............................................. G06F 1/16
(52) U.S. Cl. ...................................... 361/683; 361/687
(58) Field of Search ............................. 361/679–681, 361/683, 686

(56) References Cited

U.S. PATENT DOCUMENTS

| | | | | |
|---|---|---|---|---|
| 5,088,156 A | * | 2/1992 | Hosoi | 16/342 |
| 5,433,620 A | * | 7/1995 | Kobayashi | 439/165 |
| 5,566,048 A | * | 10/1996 | Esterberg | 361/681 |
| 6,272,006 B1 | * | 8/2001 | Lee | 361/681 |
| 6,530,784 B1 | * | 3/2003 | Yim et al. | 439/31 |

\* cited by examiner

Primary Examiner—Darren Schuberg
Assistant Examiner—Yean-Hsi Chang
(74) Attorney, Agent, or Firm—William E. Pelton, Esq.

(57) ABSTRACT

A hinge for a notebook computer includes a leaf to be fastened to a lid of the computer. The leaf has a pair of tubular portions formed at a bottom thereof, a wing extending from a first side thereof and a tenon projecting from an opposite second side thereof. A support piece is oriented perpendicularly to the leaf for additionally abutting the lid and is formed with a first through-hole aligned with the tubular portions and a mortise for receiving the tenon. A base is to be fastened to a main body of the computer. The base has an upright slab defining a second through-hole aligned with the first through-hole of the support piece. Furthermore, there is a pintle extending through the through-holes into the tubular portions so as to pivotally connect the leaf and the support piece with the base.

3 Claims, 3 Drawing Sheets

HINGE FOR A NOTEBOOK COMPUTER

BACKGROUND OF THE INVENTION

1. Field of the Invention

The present invention relates to a hinge for a notebook computer and, more particularly, to a hinge which prevents a liquid-crystal display from quivering even after the lid of a notebook computer is opened.

2. Description of Related Art

It is well known that a notebook computer is small in size and portable. One factor contributing to the smallness and portability is the use of a liquid-crystal display (LCD). In the notebook computer, the liquid-crystal display is usually formed on an inner of a lid, which is hinged on a main body of the computer by means of hinges.

Now many hinges for the notebook computers are known. As shown in FIG. 3, such a hinge generally includes a leaf (30) having a pair of tubular portions (31) and a wing (32) extending from a side of the leaf (30) to be attached to a rack (40) formed in a lid (50) of a computer. In addition, there is further provided a base (33) that has an upright slab (34) defining a through-hole (340) in alignment with the tubular portions (31) of the leaf (30). The leaf (30) and the base (33) are pivotally connected to each other, by means of a pintle (35) which extends through the through-holes (340) of the base (33) into the tubular portions (31) of the leaf (30).

Once the leaf (30) and the base (30) are fastened by screws (36), to the lid (50) and the main body (not shown) of the computer respectively, the lid (50) is hinged on the main body. Then a liquid-crystal display appears as soon as the lid (50) is turned open.

With the conventional hinge, it has been found that liquid-crystal display on the lid (50) quivers after the lid (50) is opened. This reduces the useful life of the hinge(s) and also of a flat wire electrically connecting the display to the main body.

Therefore, it is an objective of the invention to provide a hinge to mitigate and/of obviate the aforementioned problem.

SUMMARY OF THE INVENTION

The object of the present invention is to provide a hinge which prevents a liquid-crystal display from quivering after the lid of a notebook computer is opened.

Other objects, advantages and novel features of the invention will become more apparent from the following detailed description when taken in conjunction with the accompanying drawings.

DETAILED DESCRIPTION OF THE PREFERRED EMBODIMENT

Figure 1:
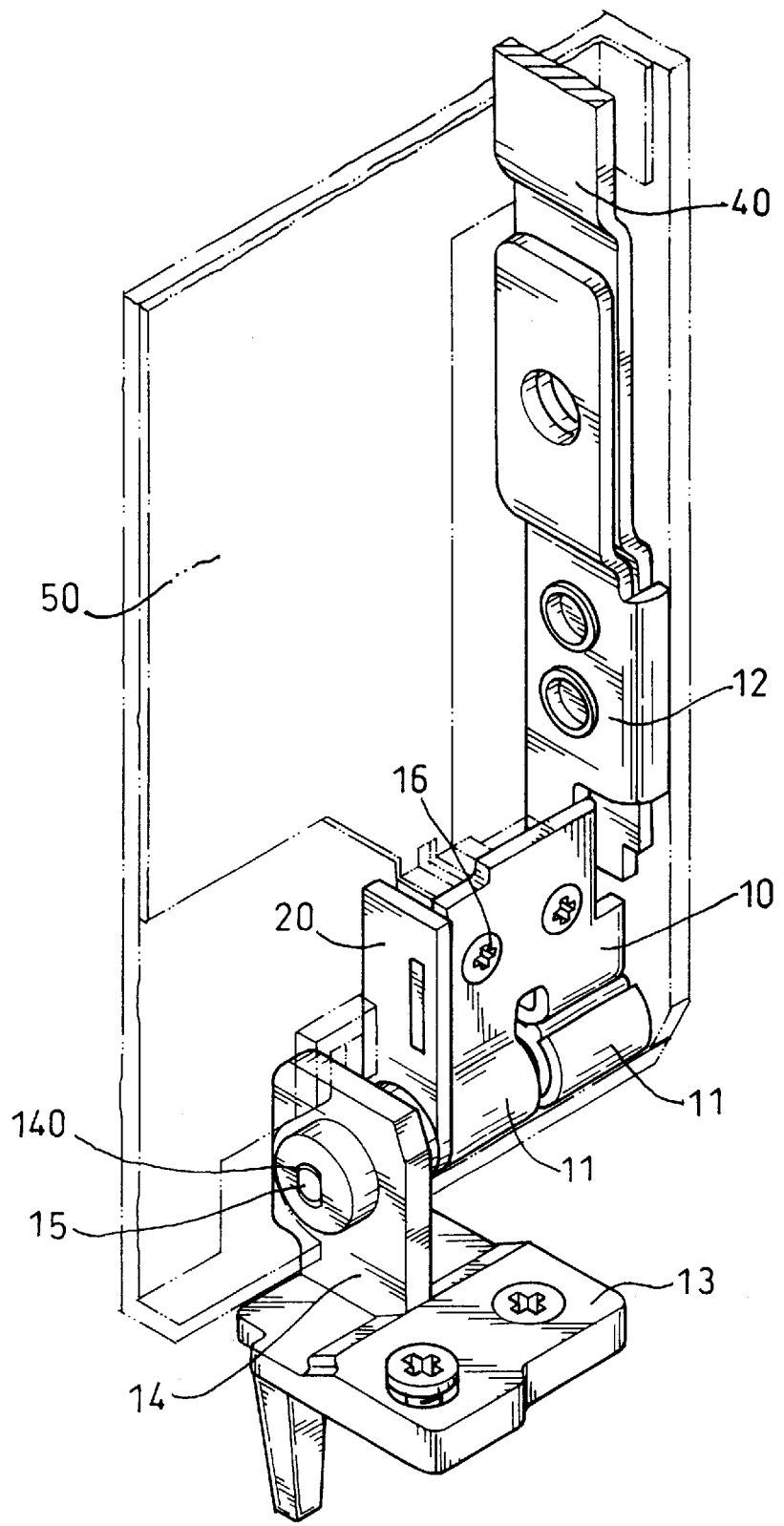
FIG. 1 is a perspective view of a hinge in accordance with the present invention for use in a notebook computer.
Figure 2:
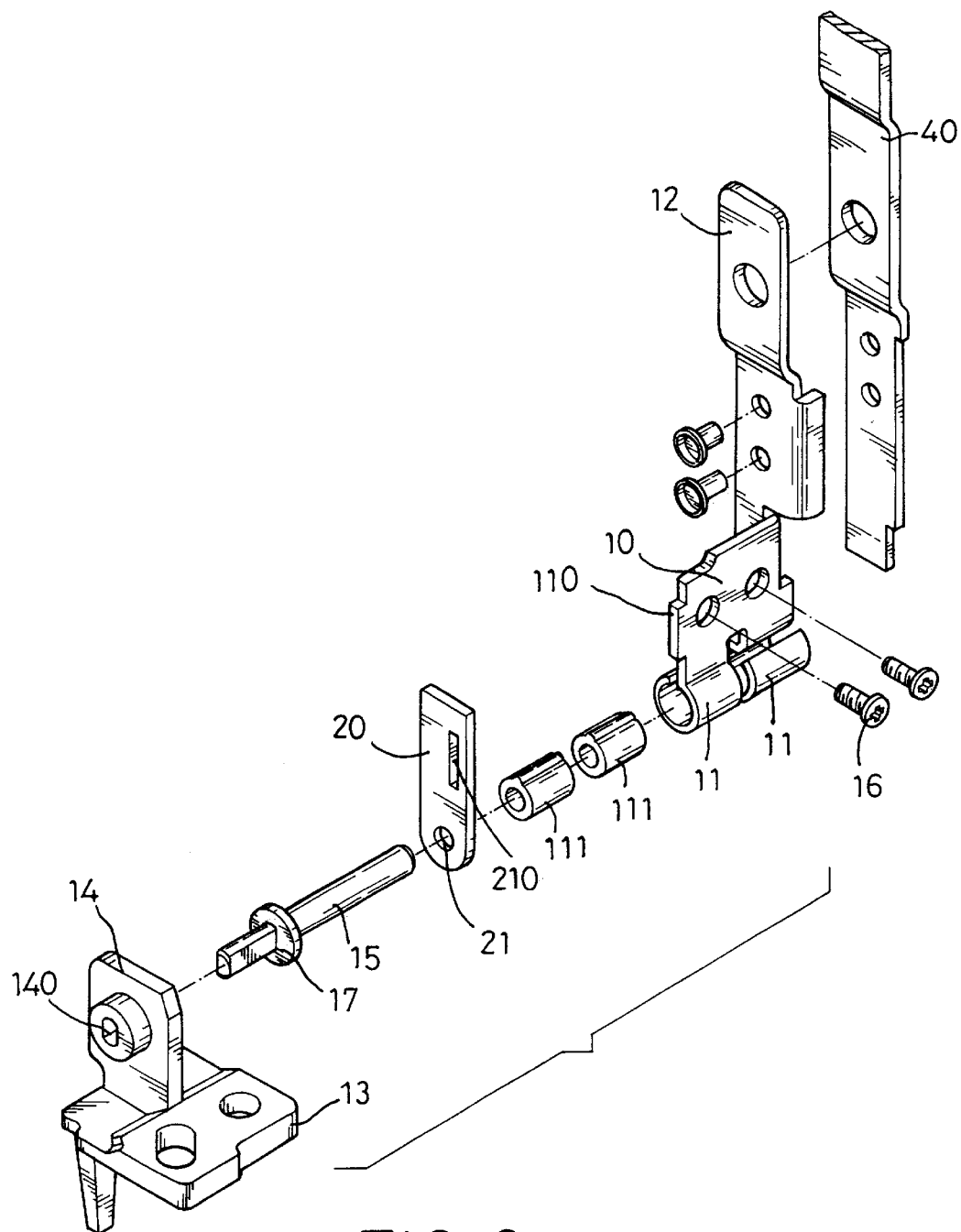
FIG. 2 is an exploded perspective view of the hinge shown in FIG. 1.
Figure 3:
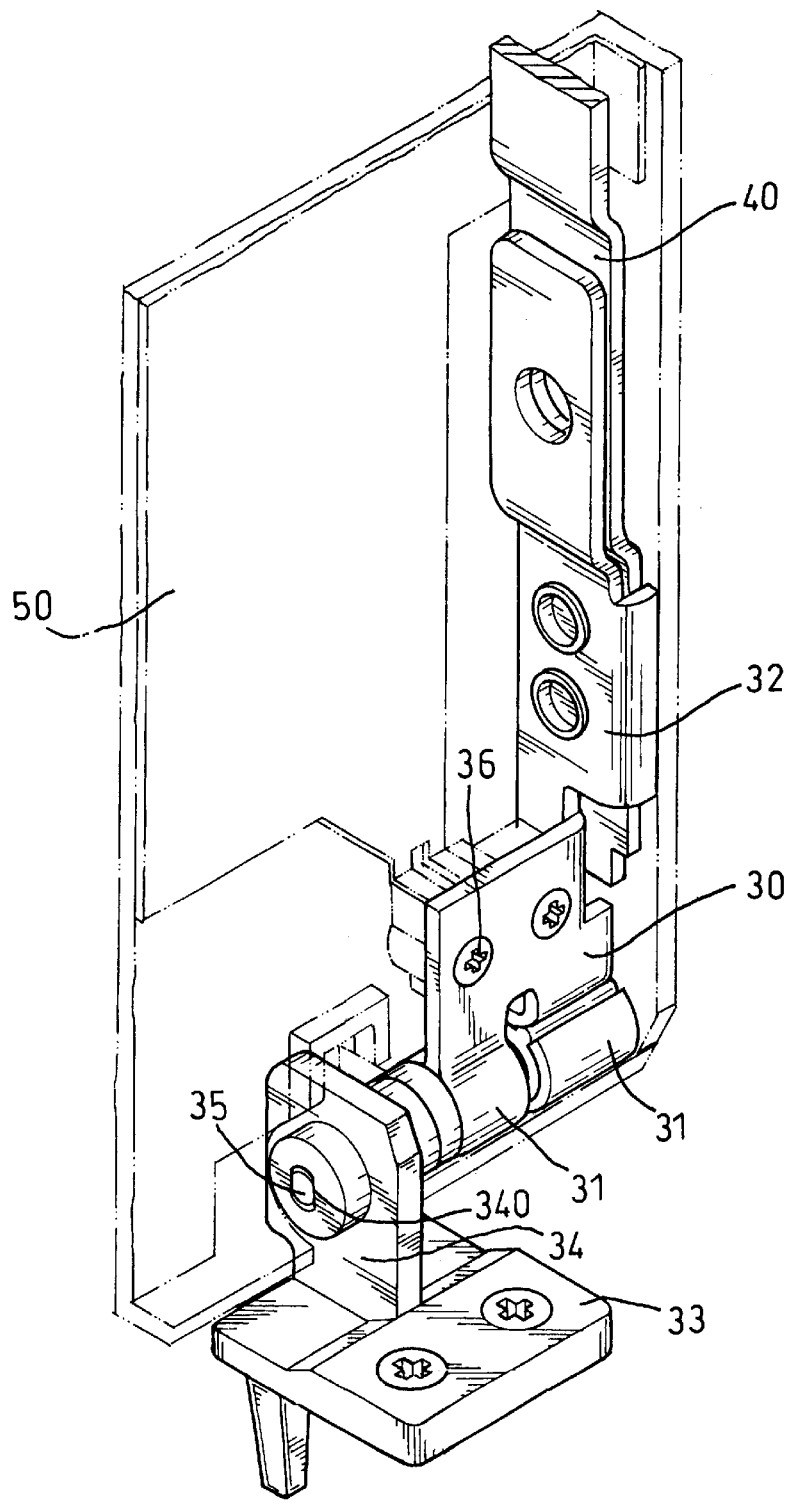
FIG. 3 is a perspective view of a conventional hinge used in a notebook computer.

Referring to FIGS. 1 and 2, there is shown a preferred embodiment of a hinge in accordance with the present invention for a notebook computer.

The inventive hinge includes a leaf (10) adapted to be fastened to a lid (50) of the notebook computer, which, as well known, is provided with a liquid-crystal display on an inner side of the lid (50). The leaf (10) has a pair of tubular portions (11) formed at a bottom thereof, with a wing (12) extending from a first side of the leaf (10) to be attached to a rack (40) formed in the lid (50). As best shown in FIG. 2, the leaf (10) further has a tenon (110) projecting from a second side of the leaf (10) opposite to the first side.

In the inventive hinge, there is provided a support piece (20) that is oriented perpendicularly to the leaf (10) for additionally abutting the lid (50) of the computer. The support piece (20) has a first through-hole (21) in alignment with the tubular portions (11) of the leaf (10). Furthermore, the support piece (20) defines a mortise (210) for receiving the tenon (110), thereby attaching the piece (20) to the leaf (10).

The hinge further includes a base (13) adapted to be fastened to a main body (not shown) of the notebook computer. The base (13) has an upright slab (14) defining a second through-hole (140) in alignment with the first through-hole (21) of the support piece (20).

The inventive hinge is assembled by means of a pintle (15) that extends through the through-holes (140, 21) into the tubular portions (11) so as to pivotally connect the leaf (10) and the support piece (20) to the base (13). The assembled hinge then can be attached to the lid (50), such as by screws (16).

In the configuration, the lid (50) is hinged on the main body and can be securely held in any open position by the additional abutment of the support piece (20). That is, the liquid-crystal display on the inner side of the lid (50) will not quiver after the lid (50) is opened.

In a highly preferred embodiment, a washer (17) is mounted around the pintle (15) and sandwiched between the support piece (20) and the upright slab (14) of the base (13), in order to release friction between the piece (20) and the slab (14) when the leaf (10) is turned with respect to the base (13).

More preferably, a pair of resilient bushings (111) may be fitted in the tubular portions (11) to provide the leaf (10) with an adequate frictional torque required for holding the lid (50) in any open position.

From the above description, it is noted that the invention has the advantage of preventing the liquid-crystal display from quivering after the lid (50) is opened.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge for a notebook computer having a main body and a lid (50), said hinge comprising:

a leaf (10) adapted to be fastened to said lid (50) of said notebook computer, said leaf (10) having a pair of tubular portions (11) formed at a bottom thereof, a wing (12) extending from a first side thereof and a tenon (110) projecting from a second side thereof opposite to said first side;

a support piece (20) oriented perpendicularly to said leaf (10) for additionally abutting said lid (50) of said notebook computer, said support piece (20) having a first through-hole (21) in alignment with said tubular portions (11) of said leaf (10) and a mortise (210) for receiving said tenon (110) of said leaf (10);

a base (13) adapted to be fastened to said main body of said notebook computer, said base (13) having an upright slab (14) defining a second through-hole (140) in alignment with said first through-hole (21) of said support piece (20); and a pintle (15) extending through said through-holes (140, 21) into said tubular portions (11) to pivotally connect said leaf (10) and said support piece (20) to said base (13);

whereby said lid (50) of said notebook computer is hinged on said main body and can be securely held in any open position by the additional abutment of said support piece (20).

2. The hinge as claimed in claim 1 further including a washer (17) mounted around said pintle (15) and sandwiched between said support piece (20) and said upright slab (14) of said base (13).

3. The hinge as claimed in claim 1 further including a pair of resilient bushings (111) fitted in said tubular portions (11) of said leaf (10).

* * * * *